United States Patent [19]
Fischer

[11] Patent Number: 4,722,977
[45] Date of Patent: Feb. 2, 1988

[54] PROCESS AND COMPOSITION FOR VISCOSITY DEGRADATION OF DIENE RUBBERS

[75] Inventor: Heinz Fischer, Marl, Fed. Rep. of Germany

[73] Assignee: Bayer Aktiengesellschaft, Leverkusen, Fed. Rep. of Germany

[21] Appl. No.: 691,932

[22] Filed: Jan. 16, 1985

[30] Foreign Application Priority Data

Jan. 26, 1984 [DE] Fed. Rep. of Germany ....... 3402626

[51] Int. Cl.$^4$ .............................................. C08F 8/50
[52] U.S. Cl. .................................. 525/350; 525/351; 525/320; 525/371; 525/332.8; 525/332.9; 525/333.1; 525/333.2
[58] Field of Search ................ 525/350, 351, 370, 371

[56] References Cited

FOREIGN PATENT DOCUMENTS 1469824  4/1977  United Kingdom .

OTHER PUBLICATIONS

*Hackh's Chemical Dictionary*, Fourth ed., McGraw-Hill, 1969, p. 192.

Primary Examiner—Edward J. Smith
Assistant Examiner—Bernard Lipman
Attorney, Agent, or Firm—Connolly and Hutz

[57] ABSTRACT

Useful boosters in admixture with a peptiser for viscosity degradation of diene rubber or its mixtures are:
(a) Iron(II)- and iron(III)-salts of inorganic acids;
(b) Iron(II)- and iron(III)-salts of organic carboxylic acids;
(c) Iron(II)- and iron(III)-salts of mercaptans;
(d) Iron(II)- and iron(III)-complexes of ethylenediamine tetra-acetic acid;
(e) Iron(II)- and iron(III)-cyanide complexes;
(f) Iron(II)- and iron(III)-complexes with dimethyl glyoxime;
(g) Iron(II)- and iron(III)-salts of quinolin carboxylic acid or sulfosalicylic acid.

3 Claims, No Drawings

PROCESS AND COMPOSITION FOR VISCOSITY DEGRADATION OF DIENE RUBBERS

This invention relates to a composition and process for viscosity degradation of crude rubbers.

In the manufacture of vulcanised rubber products diene rubbers especially natural rubber has to be reduced in molecular weight (viscosity) to make it amenable to accept the compounding ingredients such as fillers, plasticisers, activators, antidegradants, process aids and curatives necessary to improve the properties of the final product. It is necessary to degrade the rubber to lower molecular weight so that even after incorporation of the necessary compounding ingredients the viscosity of the mixture of crude rubber is adequately low. The low viscosity of the mixture of crude rubber is necessary to improve the processibility of the mixture of crude rubber during subsequent processing operations such as warming up, extrusion, calendering, solution making and dough making. The degradation of crude rubber enables one to achieve:

(i) low heat generation during warming up process;
(ii) low heat generation, low die swell, smooth extrudate surface and a faster rate of extrusion during extrusion process;
(iii) low requirements of solvents to make solutions of the crude rubber mixture in solvents, of a definite viscosity;
(iv) doughs with high solids content yet of adequately low viscosity for a spreading process;
(v) low calendar shrinkage and smoothness of surface on calendered sheet;
(vi) pliable compounds easy to use in building up process.

The mastication/peptisation or degradation in molecular weight (viscosity) of crude diene rubbers is carried out by passing the crude rubber in between tight nip of two roller mills, working the crude rubber in an internal mixer or passing the crude rubber in one or more passes through an extruder.

Mastication of crude rubber requires costly and high power machinery. The energy consumption in the process is high. In order to increase the efficiency of mastication process certain chemicals—mostly aromatic mercaptans or disulfides—are added. These chemicals are classified in rubber industry as peptisers or chemical plasticisers. The chemicals act as radical acceptors in low temperature mastication and as catalysts for high temperature mastication (oxidative mastication). Depending on the temperature of mastication a dosage of 0.05 to 3 parts by weight of these chemicals per hundred parts by weight of rubber are common. Dosages up to 3 parts by weight of these chemicals per hundred parts by weight of rubber are required in the mastication of synthetic rubbers; dosages up to 0.5 parts by weight per hundred parts by weight of rubber are required in the mastication of natural rubber.

The object of this invention is to improve the mastication efficacy of the peptisers still further by incorporation of certain chemicals which will act as cocatalysts or boosters along with the peptisers thereby make the mastication process more economical and more energy efficient.

Chemical boosters, for instance Iron phthalocyanine, heavy metal ketoximes and acetonylacetate are known. However, the disadvantage of these boosters is that they decrease the resistance to oxidative degradation of the vulcanisates made from the crude rubber masticated using the chemicals. Therefore a further object of the invention is also to find boosters which will not have any effect on the ageing characteristics of the vulcanisates manufactured from the crude rubber masticated using peptiser-booster-combinations and thus provide improved vulcanised rubber products.

We have discovered that the following class of iron compounds act as excellent cocatalyst or boosters for the peptisers/chemical plasticisers used for mastication of crude rubber:

(a) Iron(II)- and iron(III)-salts of inorganic acids;
(b) Iron(II)- and iron(III)-salts of organic carboxylic acids;
(c) Iron(II)- and iron(III)-salts of mercaptans;
(d) Iron(II)- and iron(III)-complexes of ethylenediamine tetra-acetic acid;
(e) Iron(II)- and iron(III)-cyanide complexes;
(f) Iron(II)- and iron(III)-complexes with dimethylglyoxime;
(g) Iron(II)- and iron(III)-salts of quinolin carboxylic acid or sulfosalicylic acid.

According to this invention addition of 0.01 to 10 parts by weight of any of the above mentioned chemicals on 100 parts by weight of the peptiser increases the activity of the peptiser to a great extent in mastication of crude rubber.

The present invention also provides use of combination of peptiser and booster with or without use of a carrier/dispersing material.

This invention also provides a process for the peptisation of diene rubbers which comprises using a peptiser with a booster selected from the compounds (a)–(g) mentioned above.

Suitable peptising agents are aromatic mercaptans and disulfides, pentaerythrit stearate and salts of higher carboxylic acids, e.g. pentachlorothiophenol, $\beta$-napthyl mercaptan, xylyl mercaptan, o,o'-dibenzamido diphenyldisulfide, o-benzamido thiophenol and p-tert.-butyl thiocresol.

The peptising agents used in the examples are preferred.

Preferred booster is the iron complex of EDTA.

The following tables illustrate the invention in greater detail. For all experimental results in Table I decribed as illustrative of the invention, natural rubber in the form of smoke sheets was masticated in an internal mixer for varying time periods and the degradation in viscosity was followed by measurement of Mooney Viscosity at 100° C. by means of a Mooney Viscometer. Lower value of the viscosity attained in a shorter time is indicative of the activity of the combination of peptiser and booster.

The Mooney Viscosity of the untreated natural rubber, used in the examples was ML4/100° C.=94.

Pentachlorothiophenol (A) and 0,0'-dibenzamidodiphenyldisulfide (B) were used as peptisers. Dosages of peptiser, booster and insert carrier are given as parts by weight per hundred parts by weight of natural rubber.

Table I shows that use of peptisers increases the mastication efficiency i.e. they reduce the viscosity of natural rubber in short time. When the boosters are used, the dosage of the peptiser can be reduced even by 50% and still achieve a performance equal to or better than that obtained with the use of peptiser alone.

TABLE I

Mooney Viscosity (ML4/100° C.) of natural rubber masticated in an internal mixer with and without additives as a function of time duration of mastication:

| Additives | Dosage | Mastication Time Minutes 4 | 8 | 12 | 16 |
|---|---|---|---|---|---|
| None | — | 81 | 80 | 76 | 71 |
| A + iron hemin-complex | 0.1 | 73 | 52 | 42 | 41 |
| A | 0.1 | 57 | 41 | 34 | 34 |
| B | 0.1 | 65 | 45 | 40 | 38 |
| A<br>FeEDTA Complex on<br>kaolin | 0.05<br>0.0025<br>0.0475 | 60 | 43 | 36 | 32 |
| B<br>Ferriferrocyanide on<br>kaolin | 0.05<br>0.0025<br>0.0475 | 57 | 42 | 36 | 30 |
| A<br>FeSO4 on<br>kaolin | 0.05<br>0.0025<br>0.0475 | 62 | 49 | 47 | 45 |
| A<br>Fe3(PO4)2 on<br>kaolin | 0.05<br>0.0025<br>0.0475 | 60 | 47 | 45 | 42 |
| A<br>Iron(II)-stearate on<br>kaolin | 0.05<br>0.0025<br>0.0475 | 60 | 47 | 45 | 45 |
| B<br>FeEDTA Complex on<br>kaolin | 0.05<br>0.0025<br>0.0475 | 66 | 45 | 39 | 37 |
| B<br>Fe3(PO4)2 on<br>kaolin | 0.05<br>0.0025<br>0.0475 | 66 | 51 | 46 | 42 |
| A<br>Iron(II)-quinolinate on<br>kaolin | 0.05<br>0.0025<br>0.0475 | 62 | 46 | 43 | 42 |
| A<br>Iron(II)-Sulfo-salicylate on<br>kaolin | 0.05<br>0.0025<br>0.0475 | 60 | 47 | 45 | 42 |
| A<br>Iron-(II)-pentachlorothiophenolate on kaolin | 0.05<br>0.0025<br>0.0475 | 63 | 47 | 43 | 41 |
| A<br>FeEDTA Complex on<br>kaolin | 0.025<br>0.000025<br>0.000475 | 69 | 62 | 54 | 51 |
| A<br>FeEDTA Complex on<br>kaolin | 0.025<br>0.000050<br>0.000950 | 68 | 60 | 53 | 50 |
| A<br>FeEDTA Complex on<br>kaolin | 0.025<br>0.000125<br>0.002375 | 68 | 61 | 53 | 51 |
| A<br>FeEDTA Complex on<br>kaolin | 0.025<br>0.000250<br>0.00475 | 68 | 59 | 52 | 51 |

To find the effect of the use of the boosters on the ageing characteristics of the vulcanisates, the chemicals were tested in a masterbatch composed of

| | Parts by weight |
|---|---|
| Smoked Sheets | 100 |
| Zinc oxide | 5 |
| Stearic acid | 2 |
| Dibenzothiazyl disulfide | 1 |
| Sulfur | 2.5 |

No antioxidant was used in this masterbatch so that the effect of the chemicals on ageing characteristics can be properly ascertained.

The peptisers and boosters were added to the masterbatch and the vulcanizates were cured for 40 minutes at 140° C. in hydraulic press. The vulcanisates were aged at 70° C. for six days at an oxygen pressure of 21 atmospheres.

When aged under this condition, vulcanizates which contain additives that affect the ageing characteristics will show a poorer retention of physical properties on ageing. For sake of comparison Iron phthalocyanine a peptiser-booster reported in literature has been included. The results of these studies have been shown in Table II.

TABLE II

| Masterbatch | 110.5 | 110.5 | 110.5 | 110.5 | 110.5 | 110.5 | 110.5 |
|---|---|---|---|---|---|---|---|
| B | 0.5 | 0.5 | 0.5 | 0.5 | 0.5 | 0.5 | — |
| Ironphthalocyanine on kaolin (1:22 mixture) | — | — | — | — | — | — | 0.5 |
| FeSO4 on kaolin (1:19 mixture) | 1.0 | — | — | — | — | — | — |
| Fe3(PO4)2 on kaolin (1:19 mixture) | — | 1.0 | — | — | — | — | — |
| Ironstearate on kaolin (1:19 mixture) | — | — | 1.0 | — | — | — | — |
| Ironsulfosalicylate on kaolin (1:19 mixture) | — | — | — | 1.0 | — | — | — |
| Iron EDTA complex on kaolin (1:19 mixture) | — | — | — | — | 1.0 | — | — |
| Iron Dimethylglyoxime Complex on kaolin (1:19 mixture) | — | — | — | — | — | 1.0 | — |
| % Retention in Tensile Strength | 68 | 82 | 82 | 75 | 64 | 79 | 40 |
| Change in hardness points | −3 | −2 | Nil | −4 | −2 | −2 | −10 |

The invention is applicable to mastication/peptization (visocisity degradation) of crude polymers either on mixing mill, in an internal mixer, in an extruder (plasticator), in hot air or in steam. The invention is applicable to mixtures of crude rubber with other compound ingredients such as carbon blacks, mineral fillers, pasticisers, zinc oxide, fatty acids, antidegradants, accelerators for vulcanization. The invention is also applicable to long term viscosity degradation at room temperature by incorporation in rubber at latex stage.

The peptisation boosters of the invention can be used in natural rubber and in synthetic rubbers and mixtures thereof. Synthetic rubbers in which the peptisation boosters of the invention can be used include diene rubbers such as cis-polybutadiene, cis-polyisoprene, polychloroprene, copolymers of butadiene with other monomers such as styrene and acrylonitrile.

We claim:

1. A composition comprising a diene rubber and a viscosity degradation promotor which comprises a peptiser selected from the group consisting of aromatic mercaptans, aromatic disulfides, pentaerythrit stearate and salts of higher carboxylic acids in admixture with 0.01 to 10 parts by weight per 100 parts of peptiser of a booster selected from the group consisting of:
   (a) Iron(II) - and iron(III) - salts of inorganic acids;
   (b) Iron(II) - and iron(III) - salts of organic carboxylic acids;
   (c) Iron(II) - and iron(III) - salts of mercaptans;
   (d) Iron(II) - and iron(III) - complexes of ethylenediamine tetra-acetic acid;
   (e) Iron(II) - and iron(III) - cyanide complexes of the formula;

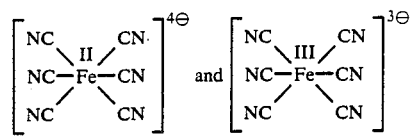

(f) Iron(II) - and iron(III) - complexes with dimethylglyoxime; and (g) Iron(II) - and iron(III) - salts of quinolin carboxylic acid or sulfosalicylic acid.

2. A composition as claimed in claim 1 wherein the peptiser is pentachlorothiophenol or 0,0-dibenzamidodiphenyldisulfide.

3. A composition as claimed in claim 1 wherein the viscosity degradation promotor contains additionally a carrier.

* * * * *